(12) United States Patent
Clement

(10) Patent No.: US 7,543,978 B2
(45) Date of Patent: Jun. 9, 2009

(54) WINE WHISK WITH BOTTLE STOPPER

(76) Inventor: Lisa W. Clement, 2808 Daniel Ave., Dallas, TX (US) 75205

(*) Notice: Subject to any disclaimer, the term of this patent is extended or adjusted under 35 U.S.C. 154(b) by 147 days.

(21) Appl. No.: 11/684,488

(22) Filed: Mar. 9, 2007

(65) Prior Publication Data
US 2008/0219092 A1    Sep. 11, 2008

(51) Int. Cl.
*A47J 43/10* (2006.01)
(52) U.S. Cl. .................................. 366/129; 215/364
(58) Field of Classification Search ............ 366/129, 366/130, 342, 343; 416/69, 70, 227 R, 231 A; 99/323.1, 348; 215/355–364; 15/141.1, 15/141.2, 143.1; D7/376–380, 412, 688, D7/690
See application file for complete search history.

(56) References Cited
U.S. PATENT DOCUMENTS

| | | | | |
|---|---|---|---|---|
| 4,494,452 A * | 1/1985 | Barzso | .................. | 99/323.1 |
| 5,595,104 A * | 1/1997 | Delaplaine | .................. | 99/323.1 |
| 5,688,045 A * | 11/1997 | Butte | .................. | 366/129 |
| 6,508,163 B1 * | 1/2003 | Weatherill | .................. | 99/323.1 |
| 7,213,964 B2 * | 5/2007 | Holcomb et al. | .................. | 366/129 |
| 2002/0117055 A1 * | 8/2002 | Liebmann, Jr. | .................. | 99/277.1 |
| 2004/0238479 A1 * | 12/2004 | Caswell et al. | .................. | 215/364 |
| 2005/0128864 A1 * | 6/2005 | Holcomb et al. | .................. | 366/129 |
| 2005/0184026 A1 * | 8/2005 | Haley | .................. | 215/306 |
| 2006/0215484 A1 * | 9/2006 | Sokoloff | .................. | 366/129 |
| 2007/0090082 A1 * | 4/2007 | Yoshida et al. | .................. | 215/315 |
| 2008/0219092 A1 * | 9/2008 | Clement | .................. | 366/343 |

FOREIGN PATENT DOCUMENTS

JP        7-313388    * 12/1995

* cited by examiner

*Primary Examiner*—Charles E Cooley
(74) *Attorney, Agent, or Firm*—Howison & Arnott, L.L.P.

(57) ABSTRACT

XA wine aeration tool comprises a bottle stopper for stoppering a bottle. The bottle stopper has a first end for insertion into the bottle and a second end. An agitator connects to the second end of the bottle stopper for aerating wine in a container.

12 Claims, 2 Drawing Sheets

WINE WHISK WITH BOTTLE STOPPER

TECHNICAL FIELD

The present invention relates to the aeration of wine, and more particularly, a handheld tool for aerating wine in a container.

BACKGROUND

One requirement in the tasting and drinking of red wines is the necessity of allowing the wine to breathe for a period of time prior to tasting and/or drinking of the wine. By allowing the wine to breathe the taste of the wine is improved and sharp, tangy flavors associated with a newly opened bottle of wine are often alleviated providing the wine with a better overall flavor. In many cases, it is often desirable to allow the wine to breathe for approximately twenty (20) minutes. This, of course, requires the wine to be opened and then placed aside for the required time period to achieve the desired flavor. In many cases this may not be a problem, but if a host or provider forgets to open the wine sufficiently before its serving, or if the time to allow for proper breathing is not available, this requires the drinking of the wine having a less than optimal flavor before it has properly aerated.

Although a common practice, simply opening a bottle does not allow proper aeration because there is not enough room for the surface-air exchange. Additional solutions involve the use of wine decanters. Wine decanters enable the removal of sediments from the wines and additionally provide for oxygenation of the wine. All red wines, especially young red wines, benefit from the oxygenation that occurs during the decanting process. A good decanting process involves the wine trickling down the walls of the decanter, imparting a fuller flavor to the wine while taking off the unwelcome edge from the taste of the wine. While this process of using a decanter may be somewhat quicker than merely opening the bottle and allowing it to breathe on its own. The decanting process requires the purchase of an expensive and relatively large decanter for placing the wine into prior to consumption of the wine. Thus, there is a need for an improved method of aerating red wines that does not require the normal periods of time required in allowing the wine to breathe to achieve its full flavor or in the expense and bulk associated with alternative methods such as wine decanters.

SUMMARY

The present invention disclosed and claimed herein, in one aspect thereof, comprises a wine aeration tool. The wine aeration tool includes a bottle stopper for stopping a bottle. The bottle stopper includes first and second ends wherein the first end is used for insertion into the bottle. The wine aeration tool additionally includes an agitator connected to the second end of the bottle stopper. The agitator is used for aerating wine in a container.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Figure 1:
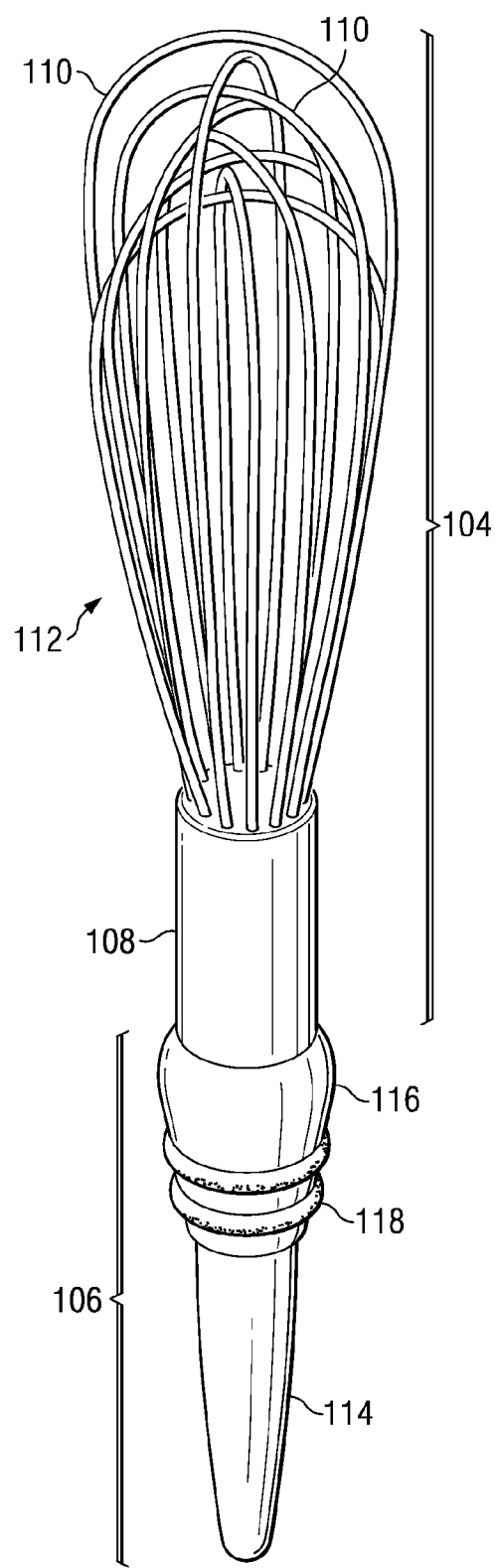
FIG. 1 is an illustration of a wine whisk.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Referring now to FIG. 1, there is illustrated the wine whisk 102. The wine whisk 102 consists of an agitator 104 that is utilized for aeration of wine within a glass and a second portion consisting of a wine bottle stopper 106. The agitator 104 includes a neck cylinder 108. The neck cylinder 108 performs as a connection point for a number of whisk loops 110 that comprise the whisk 112. The neck cylinder 108 additionally provides means for interconnecting the agitator 104 with the wine bottle stopper 106. In the illustrated embodiment, the agitator 104 is epoxied to the bottle stopper 106. However, it should be realized that the agitator 104 could be welded or soldered to the wine bottle stopper 106 or additionally could be integrally formed as a part of the wine bottle stopper 106 such that the neck 108 and wine bottle stopper 106 comprise one integrated component.

The whisk 112 comprises a number of overlapping whisk loops 110. Each end of the whisk loops 110 are connected on opposite sides of the neck 108. A plurality of the overlapping whisk loops 110 provide the whisk 112 that is used for aerating wine within a glass or other container. While the present description has illustrated the use of wire loops to form the whisk 112 additional configurations are possible wherein instead of loops, paddles, wires or other structures capable of aerating/agitating wine within a wine glass may be used, the only requirement is that the structures are capable of agitating the wine within the glass to create the aeration process that improves the flavor of the wine.

The wine bottle stopper 106 consists of a conical neck guide 114 that is used for guiding the wine bottle stopper 106 into a wine bottle. Integrally connected with the neck 114 is the stopper 116 which is of a sufficient diameter to lodge within the neck of a wine bottle and close the wine bottle. Surrounding the stopper 116 are one or more gaskets 118 which are used for assisting in sealing the stopper 116 in the neck of a bottle and assisting in providing a snug connection that will prevent air and/or liquid from seeping past the sealed gaskets 118 while still enabling an individual grasping the agitator 104 to relatively easily remove the wine bottle stopper 106 from a wine bottle to enable the drinking of additional wine from the bottle.

As referred to in FIG. 1, the wine bottle stopper 106 comprises a bulbous shaped stopper portion for insertion into the neck of the bottle of wine. The bulbous shaped stopper portion has a larger diameter section adapted to have a diameter larger than the wine bottle opening to cover the opening and further includes a smaller diameter section. The conically shaped neck guide 114 is connected at its base to the bulbous shaped stopper portion at the smaller diameter section. The base of the conically shaped neck guide has a diameter smaller than the smaller diameter section of the bulbous shaped stopper. The annular shaped sealing gasket rings 118 surround the smaller diameter section of the bulbous shaped stopper portion.

The wine whisk 102 may be made form any number of materials. The agitator 104 and wine bottle stopper 106 may be made of the same or different materials. These materials include stainless steel, chrome, plastic, nylon, polymer or any other number of materials. The sealing gaskets 118 in the preferred embodiment consist of silicone rings. However, other materials, for example, rubber or other flexible materials, may be utilized for providing the sealing gaskets 118.

Figure 2:
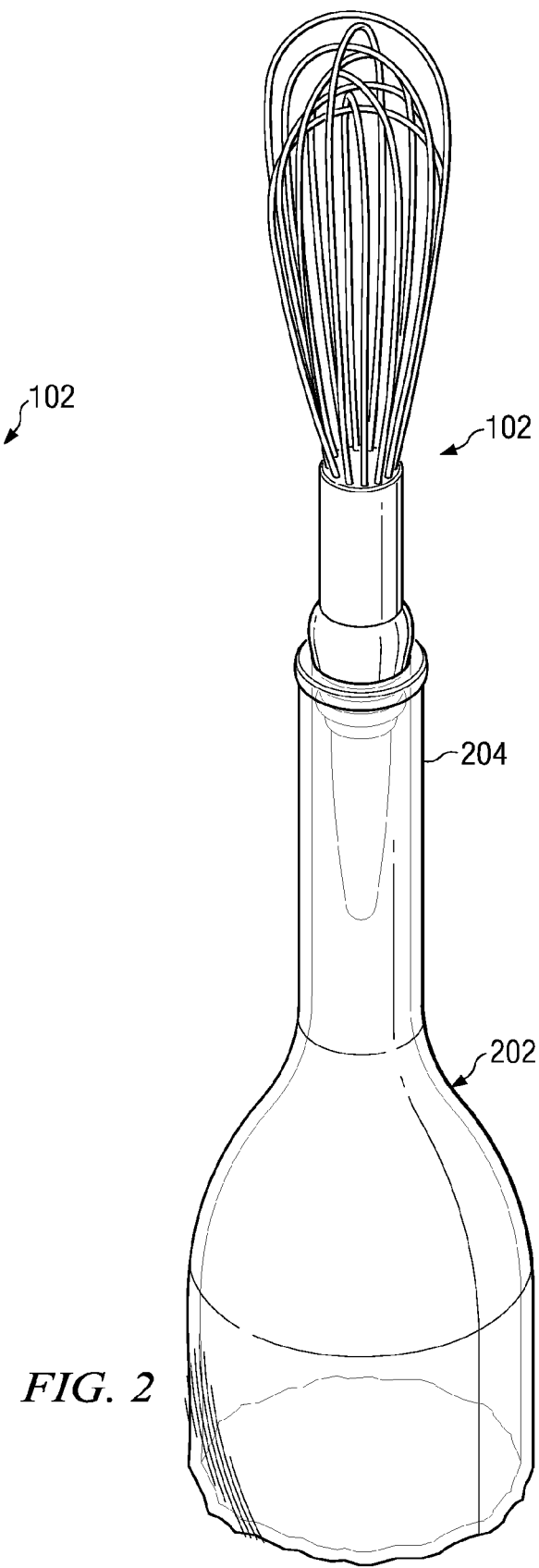
FIG. 2 illustrates the use of the wine whisk as a wine bottle stopper.
Figure 3:
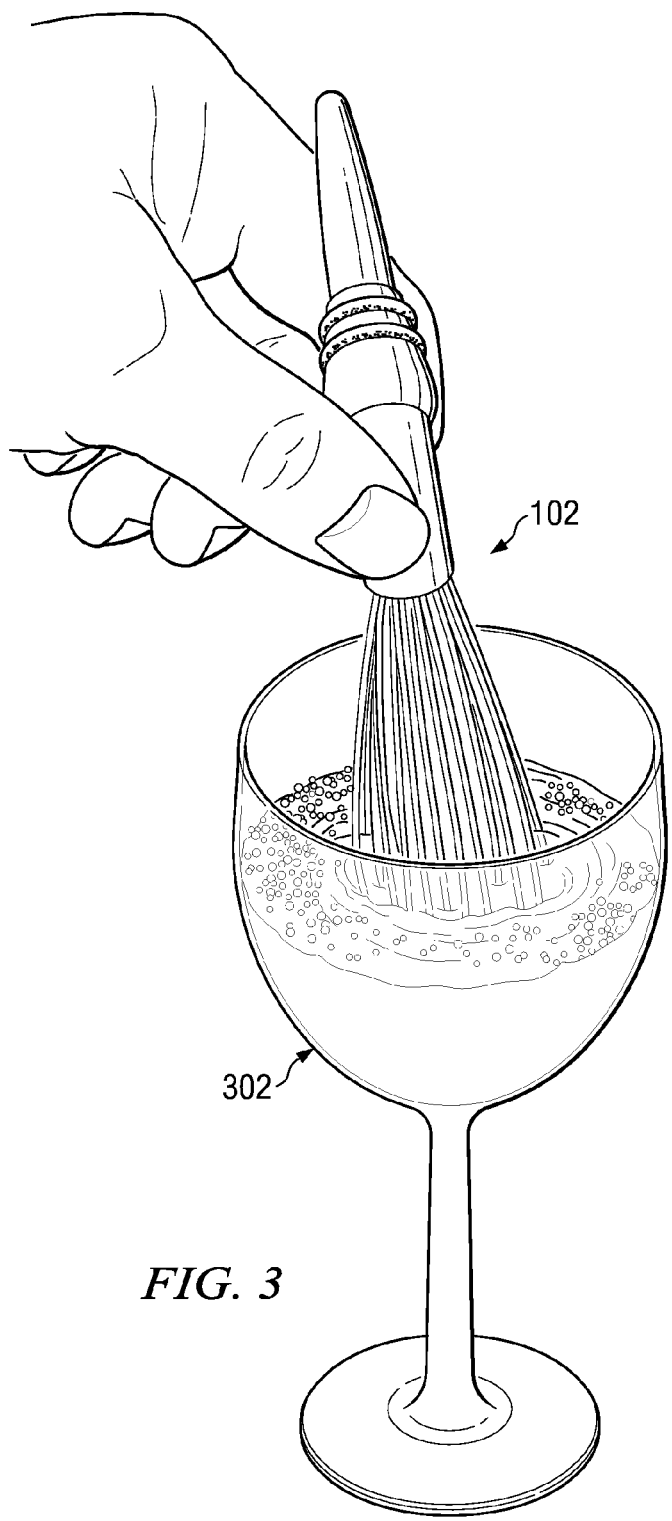
FIG. 3 illustrates the use of the wine whisk as a whisk for aerating wines.

Referring now to FIGS. 2 and 3, there are illustrated the various uses of the wine whisk 102. FIG. 2 illustrates the use of the wine whisk 102 as a wine bottle stopper. The wine whisk 102 is inserted into a wine bottle 202. The bottle stopper portion 106 is inserted within a neck 204 of the wine bottle 202 to seal wine within the bottle 202 and to prevent external air from getting into the bottle 202. The bottle stopper 106 may be removed from the wine bottle by grasping the neck 108 of the agitator 104 in order to remove the wine whisk 102 from the bottle.

FIG. 3 illustrates the use of the wine whisk 102 in aerating a glass 302 of red wine. In this case, the wine whisk 102 is used to stir the wine within the wine glass 302. The use of the agitator 104 of the wine whisk agitates the wine within the wine glass 302 aerating it to provide the characteristic flavors to the wine that are normally associated with the process of allowing the wine to breathe for a short period of time. The difference is that rather than the wine having to sit out for an extended period of time or placing the wine within a device such as a wine decanter, the individual must only stir or agitate the wine within their glass for a period of a few seconds in order to achieve a froth in the wine and create the same affect which normally requires many minutes of time allowing the wine to breathe. Prior to the aeration of the wine, the wine may taste tart, sharp or tangy while aeration of the wine using the wine whisk provides a smoother, softer flavor to the red wine.

Figure 4:
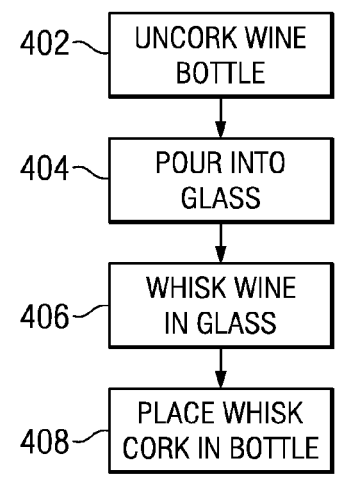
FIG. 4 is a flow diagram describing the process for use of the wine whisk.

Referring now to FIG. 4 there is a flow diagram illustrating the process for use of the wine whisk 102. Initially, the bottle of wine is uncorked at step 402 to provide access to the wine within the bottle. The wine may then be poured into a wine glass at step 404. Alternative containers to a wine glass may be used. Once the wine has been placed within the wine glass, the wine may be whisked, stirred or agitated with the wine whisk at step 406 in order to aerate the wine and provide the improved flavor characteristics discussed hereinabove. Once the wine has been whisked, the wine whisk 102 may be placed back within the bottle as a wine stopper in order to close the bottle until additional wine is desired at step 408.

In addition to using the wine whisk 102 to aerate a glass of red wine or to act as a stopper for a wine bottle, the compact size of the wine whisk 102 enables it to be used as a versatile bar tool. The whisk 112 may be used to stir all different kinds of mixed drinks with the user using the neck 108 and bottle stopper 106 as the handle for the stirring. The whisk 112 may also be used to defizz champagne or whisk any product that needs whisking in cooking, drink making, etc. Additionally, the stopper portion 106 has many uses other than stoppering red wine bottles and may be used for stoppering olive oil container, vinegar bottles and other similarly sized bottles.

It will be appreciated by those skilled in the art having the benefit of this disclosure that this invention provides an improved product for aerating and stoppering wine. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A wine aeration tool, comprising:
 a wine bottle stopper for stoppering an opening of a bottle of wine located at a first end of the wine aeration tool, the wine bottle stopper having a first end for insertion into the bottle of wine and a second end, the wine bottle stopper further comprising:
 a bulbous shaped stopper portion for insertion into a neck of the bottle of wine, the bulbous shaped portion having a larger diameter section adapted to have a larger diameter than the wine bottle opening to cover the opening and having a smaller diameter section;
 a conically shaped neck guide having a base connected to the stopper portion at the smaller diameter section and said base having a diameter smaller than the smaller diameter section of the stopper for guiding the wine bottle stopper into the neck of the bottle of wine;
 at least one annular sealing gasket ring surrounding the smaller diameter section of the stopper portion for substantially sealing the stopper portion within a neck of the bottle of wine and preventing air and liquid from seeping past the stopper portion; and
 a whisk portion located at the second end of the wine aeration tool and connected to the larger diameter section of the stopper portion and including a plurality of wire loops for aerating wine in a container.

2. The wine aeration tool of claim 1, wherein the whisk portion further comprises a cylindrical neck for interconnecting the wire loops with the second end of the wine bottle stopper.

3. The wine aeration of claim 1, wherein the at least one annular sealing gasket ring comprises a silicone gasket ring.

4. The wine aeration tool of claim 1, wherein the wine bottle stopper and the whisk portion are fixedly connected to each other.

5. The wine aeration tool of claim 1, wherein the wine bottle stopper and the whisk portion are integrally formed.

6. The wine aeration tool of claim 1, wherein the at least one annular sealing gasket ring comprises two annular sealing gasket rings surrounding the smaller diameter section of the stopper portion.

7. An agitating apparatus comprising:
 a bottle stopper for stoppering an opening of a bottle located at a first end of the agitating apparatus, the bottle stopper having a first end for insertion into the bottle and a second end, the bottle stopper further comprising:
 a bulbous shaped stopper portion for insertion into a neck of the bottle, the bulbous shaped portion having a larger diameter section adapted to have a larger diameter than the bottle opening to cover the opening and having a smaller diameter section;
 a conically shaped neck guide having a base connected to the stopper portion at the smaller diameter section and said base having a diameter smaller than the 10 smaller diameter section of the stopper for guiding the bottle stopper into the neck of the bottle;

at least one annular sealing gasket ring surrounding the smaller diameter section of the stopper portion for substantially sealing the stopper portion within a neck of the bottle and preventing air and liquid from seeping past the stopper portion; and a whisk portion located at the second end of the agitating apparatus and connected to the larger diameter section of the stopper portion and including a plurality of wire loops.

8. The apparatus of claim 7, wherein the whisk portion further comprises a cylindrical neck for interconnecting the wire loops with the second end of the bottle stopper.

9. The apparatus of claim 7, wherein the at least one annular sealing gasket ring comprises a silicone gasket ring.

10. The apparatus of claim 7, wherein the bottle stopper and the whisk portion are fixedly connected to each other.

11. The apparatus of claim 7, wherein the bottle stopper and the whisk portion are integrally formed.

12. The apparatus of claim 7, wherein the at least one annular sealing gasket ring comprises two annular sealing gasket rings surrounding the smaller diameter section of the stopper portion.

* * * * *